(12) United States Patent  
Brooks et al.

(10) Patent No.: US 8,918,717 B2  
(45) Date of Patent: Dec. 23, 2014

(54) METHOD AND SYTEM FOR PROVIDING COLLABORATIVE TAG SETS TO ASSIST IN THE USE AND NAVIGATION OF A FOLKSONOMY

(75) Inventors: David A. Brooks, Providence, RI (US); Michael Muller, Medford, MA (US); Sandra L. Kogan, Newton, MA (US)

(73) Assignee: International Business Machines Corporation, Armonk, NY (US)

( * ) Notice: Subject to any disclaimer, the term of this patent is extended or adjusted under 35 U.S.C. 154(b) by 2229 days.

(21) Appl. No.: 11/745,315

(22) Filed: May 7, 2007

(65) Prior Publication Data

US 2008/0282198 A1 Nov. 13, 2008

(51) Int. Cl.
*G06F 17/30* (2006.01)
*G06Q 10/10* (2012.01)

(52) U.S. Cl.
CPC ...................................... *G06Q 10/10* (2013.01)
USPC ........... 715/738; 715/741; 715/745; 715/853; 715/854; 707/771; 707/777

(58) Field of Classification Search
USPC ............................ 715/738; 707/101, 771, 777
See application file for complete search history.

(56) References Cited

U.S. PATENT DOCUMENTS

| | | | |
|---|---|---|---|
| 5,956,726 A | 9/1999 | Aoyama et al. | |
| 6,094,657 A | 7/2000 | Hailpern et al. | |
| 6,098,071 A | 8/2000 | Aoyama et al. | |
| 6,305,012 B1 | 10/2001 | Beadle et al. | |
| 6,526,410 B1 | 2/2003 | Aoyama et al. | |
| 6,823,491 B1 | 11/2004 | McBrearty et al. | |
| 7,599,950 B2 * | 10/2009 | Walther et al. | 1/1 |
| 7,664,760 B2 * | 2/2010 | Christian et al. | 1/1 |
| 7,668,821 B1 * | 2/2010 | Donsbach et al. | 705/27 |
| 2003/0154071 A1 * | 8/2003 | Shreve | 704/9 |
| 2006/0010117 A1 | 1/2006 | Bonabeau et al. | |
| 2007/0016575 A1 * | 1/2007 | Hurst-Hiller et al. | 707/5 |
| 2007/0106662 A1 * | 5/2007 | Kimbrough et al. | 707/5 |
| 2008/0092044 A1 * | 4/2008 | Lewis et al. | 715/713 |
| 2008/0104032 A1 * | 5/2008 | Sarkar | 707/3 |
| 2008/0275851 A1 * | 11/2008 | Taylor et al. | 707/3 |

FOREIGN PATENT DOCUMENTS

WO   WO 02/17162 A2   2/2002

OTHER PUBLICATIONS

Niwa et al., Web Page Recommender System based on Folksonomy Mining for ITNG '06 Submissions, IEEE, 2006.
Gordon-Murnane, Laura, Social Bookmarking, Folksonomies, and Web 2.0 Tools, Journal: Searcher, vol. 14, No. 6. p. 26-28, Jun. 2006. http://realitylab.at/wp/folksonomy, "Folksonomy", Jul. 25, 2006.

* cited by examiner

*Primary Examiner* — Alvin Tan
(74) *Attorney, Agent, or Firm* — David A. Dagg (57) ABSTRACT

A system for providing collaborative tag sets to assist in the navigation and use of a folksonomy. The collaborative tag sets are social in nature. As more users group two tags together into tag sets, the disclosed system causes the association between those two tags to grow stronger, as exposed in the bookmark system user interface when alternative tags are suggested for browsing the bookmarks in a folksonomy. Tags that are grouped together by a user into a tag set have the strongest possible weight for that user, and accordingly the disclosed system automatically applies all tags in a set when that user is retrieving bookmarks if the user selects at least one of tags in the set. Tags not in the user's tag sets, but included in the public tag set(s) of another user(s) are displayed in the user interface as tag suggestions.

16 Claims, 6 Drawing Sheets

METHOD AND SYTEM FOR PROVIDING COLLABORATIVE TAG SETS TO ASSIST IN THE USE AND NAVIGATION OF A FOLKSONOMY

FIELD OF THE INVENTION

The present invention relates generally to systems for categorizing content on the Web using tags, and more specifically to a method and system for providing collaborative tag sets to assist navigation of a folksonomy.

BACKGROUND OF THE INVENTION

As it is generally known, the phrase "Web 2.0" refers to a new generation of Web-based services that emphasize online collaboration and sharing among users. Social bookmarking is thought of as a key Web 2.0 component. In a social bookmarking system, a social bookmarking Web site provides a mechanism for users to store, classify, search and share links (i.e. hyperlinks) as bookmarks. Users can save lists of bookmarks that may be shared or kept private. Users bookmark resources (e.g. Web pages) that are meaningful to them, and associate tags with bookmarks to create a folksonomy. A tag can be a keyword or label of some kind. The act of sharing bookmarks and tags makes such systems social in nature. Bookmarks in a social bookmarking system may be shared with the public, or with a network of users (also known as the social bookmarking "community"). For purposes of explanation herein, the term "bookmark" is used throughout to refer to a bookmark defined in a social bookmarking system, and that accordingly may be either private or shared.

Existing social bookmarking systems support resource categorization based on freely chosen, user-defined keywords ("tags") that may also be shared with the public or a user network. These systems generally allow users to search for bookmarks associated with a selected tag, and also operate to rank bookmarked resources based on the number of users that have bookmarked them.

The collection of tags applied to Web pages bookmarked in a social bookmarking community may be used to generate a structure of associations referred to as a "folksonomy". The primary characteristic of a folksonomy is that it is user-defined. Accordingly, unlike a taxonomy, which operates using a fixed vocabulary, a folksonomy has an open-ended vocabulary, evolving based on tags freely chosen by end-users. A folksonomy represents relationships between bookmarks and user defined tags, and may also represent relationships of users to tags and to other users. Folksonomies may also allow derivation of the relationships between tags. The socially relevant information available in a folksonomy is considered to be a great asset. The immediate feedback that can be derived from this information motivates end users to tag more bookmarks, and supports effective browsing for desired content. Tags are useful for searching and sharing bookmarks. Users can use the tags that are already defined for a bookmark, or create their own.

Despite all the benefits of existing folksonomies, some shortcomings arise relative to traditional taxonomies. The frequent use of different terms having similar or identical meanings, different stems of the same term, and differences in case, all may result in ambiguities that don't exist when the tag space is fixed (e.g. defined in a controlled vocabulary that cannot be extended by end-users). These ambiguities may inhibit effective and efficient information discovery, and there is accordingly a critical need for end users to communally express the relationships between such semantically related terms to overcome such limitations.

Existing social bookmarking applications have attempted to address ambiguities in folksonomy data using various techniques. One approach has been to provide guided tagging of bookmarked resources. End users are prompted to reuse previously defined tags in order to prevent the unknowing creation of multiple tags that are trivial variants of one another, and/or the use of uncommon spellings of tag terms. To this end, as a user begins to enter a newly defined tag, a set of previously defined tags that match the entered letters are displayed, e.g. sorted in an order reflecting frequency of previous use. Along this same line, some existing systems provide a list of popular tags used by others who have bookmarked the Web page that the new tag will be associated with. This approach, although enabling end users to tag with greater consistency, does not deal with ambiguities that nevertheless do arise in the tag space, because of inconsistencies in spelling, synonyms, and varying stems. Similarly, systems providing auto-completion assistance to users entering new tag terms fail to address the use of synonyms with completely different spellings as different tags.

Some existing systems have used case insensitivity to address problems of tag ambiguity and inconsistency. Systems such as del.icio.us allow end users to define tags in upper and/or lower case characters, but provide case insensitive tag browsing. This enables end users to browse bookmarks even when they are tagged with differing case tags, without restricting the ability of end users to freely choose the way their own tags are displayed. However, this only solves a small piece of the overall problem, and does not address the more significant problems arising from the use of tags that are synonyms, misspellings, varying stems, and/or differing word concatenations or combinations. Some existing systems (e.g. del.icio.us) allow end-users to create tag bundles that visually represent logical groupings of tags in the user interface. In such systems, a user might cause similar tags to be displayed together under a label that makes sense to that user. However, the tag bundles provided by existing systems are for the individual end user only, are not social in nature (i.e. not shared), and are used only to provide labeled visual grouping of tags in the end user's user interface. When browsing among the tags in a bundle, only individual tags displayed within the bundle can be selected by the user (i.e. clicked on), and thus the user may still be required to navigate each individual tag in the bundle to find the desired bookmarks.

The Flickr photo sharing Web site provides tag "clouds" that visually represent tag sets, in which more frequently used tags in the set are depicted in a larger font or otherwise visually emphasized. Selection by the user of a single tag produces a number of tag clusters that are closely related. The clusters help users navigate related tags based on the underlying meaning of a term. This approach assists in distinguishing bookmarks based on the intended meaning of a tag, but does not aid in dealing with variations on a single tag (i.e. case, stems, similar terms, concatenation of terms etc.), since these groupings are based on how frequently two tags are used in a single bookmark.

For the above reasons and others, it would therefore be desirable to have a new system for providing collaborative tag sets to assist navigation of a folksonomy.

SUMMARY OF THE INVENTION

To address the above described and other shortcomings of previous approaches, a new method and system are disclosed for providing collaborative tag sets to assist navigation of a folksonomy in a social bookmarking system. The collaborative tag sets of the disclosed system are social in nature. As more users group two tags together into tag sets, the disclosed system causes the association between those two tags to grow stronger. This stronger relationship between the two tags is exposed in the social bookmarking system user interface when alternative tags are suggested for browsing bookmarks in a folksonomy. Tags that are grouped together by a user into a tag set have the strongest possible weight for that user, and accordingly the disclosed system automatically applies all tags in a set when that user is retrieving bookmarks if the user selects at least one of tags in the set. Tags not in the user's tag sets, but included in the public tag set(s) of another user(s) are displayed in the user interface as tag suggestions, reflecting the social nature of other user's public tag sets.

A user interface display of a social bookmarking application enables a user to create named tag sets, where each tag set consists of multiple tags. The tag sets of the disclosed system may be private to the defining user, or may be shared with other members of the social bookmarking community. The disclosed private and public tag sets may be freely nested in a hierarchy of tag sets, such that a first tag set can be contained within a second tag set, such that selecting the second tag set for an operation also automatically selects all tags contained in the first tag set.

Inter-tag relationships defined by the tag sets of the disclosed system are integrated into a folksonomy of an underlying social bookmarking system. The disclosed tag sets are created and modified by users independent of specific bookmarked resources, and accordingly represent tag relationships that are also independent of specific bookmarked resources.

The disclosed tag sets may be used to assist in retrieval of bookmarks from the folksonomy of a social bookmarking system. In response to a user command, the disclosed system uses tag sets to retrieve lists of bookmarks. For example, in one embodiment, the disclosed system provides a mechanism for a user to request display of all bookmarks that are associated with at least one tag contained in a specified tag set.

In one embodiment, when a user selects a tag in order to retrieve bookmarks associated with that tag, a determination is made as to whether the selected tag belongs to at least one tag set. If the selected tag belongs to a tag set, a prompt is displayed to the user allowing the user to additionally request retrieval of bookmarks associated with one or more other tags contained in at least one tag set to which the originally selected tag also belongs. The set of additional tags from which the user can select based on tag set membership may be made up of tags within one or more of the user's private tag sets to which the originally selected tag belongs, and/or to one or more shared tag sets created by the user or other users, to which the originally selected tag belongs. In one embodiment, separate lists of selectable tags are displayed for tags found in the user's private tag sets, and for tags found in shared tag sets. The tag order in the selectable tag lists may be based on frequency of association between tags in the tag sets and the originally selected tag. The bookmarks returned to the requesting user are cumulatively determined by a logical "OR" combination of those bookmarks associated with the originally selected tag, plus any bookmarks associated with at least one of the additionally selected tags from the selectable tag list(s).

The disclosed system may further be embodied such that when a user requests retrieval of bookmarks associated with a tag belonging to a tag set, a prompt is provided to the user enabling the user to request retrieval of all bookmarks associated with at least one tag belonging to the tag set. Such a capability may be provided by enabling the user to select the name of a tag set to which the originally selected tag belongs. In the event that the originally selected tag belongs to multiple tag sets, then a list of those tag sets to which the originally selected tag belongs may be presented to the user, allowing the user to select one or more tag set names from the tag set list. The bookmarks returned would then be for all resources associated with at least one tag contained in at least one of the selected tag sets.

The tag sets of the disclosed system may also be used to suggest alternative tags when a user is associating a tag with a bookmark. In one embodiment, the disclosed system provides visual display objects enabling a user to select alternative (or additional) tags based on tag set associations, at the time the user enters a tag to be associated with a currently selected bookmark. In one embodiment, when a user enters a tag to be associated with a bookmark, the disclosed system determines whether the entered tag belongs to one or more tag sets. The disclosed system then displays a list of tags that are associated with the originally entered tag by belonging to one or more tag sets to which the originally entered tag also belongs. For example, a first list of tags belonging to tag sets defined by the user, and to which the originally entered tag also belongs, may be displayed. A second list of tags belonging to shared tag sets defined by other users, and to which the originally entered tag also belongs, may also be displayed to the user. Tags within such displayed lists of alternative or additional selectable tags may be ordered based on frequency of association, e.g. based on how frequently the tags belong to tag sets to which the originally entered tag also belongs. Thus tags contained in relatively more tag sets to which the originally entered tag also belongs would be listed closer to the top of the list than tags having relatively fewer tag sets in common with the originally entered tag. The user is thus enabled to select an alternative or additional tag from the selectable tag lists to associate with the bookmark. In one embodiment, only those alternative tags that are associated with the entered tag in at least a threshold number of tag sets are displayed as possible additions or alternatives.

In another embodiment, the disclosed system enables a user to associate all tags contained in a tag set with a bookmark by entering the tag set name into the user interface provided for associating tags with bookmarks.

The disclosed system provides many advantages over previous solutions. First, while some previous solutions have attempted to prevent tag inconsistency, the disclosed system advantageously addresses the problem of inconsistency after it occurs by harnessing the social bookmarking community's resources to form shared tags sets, in addition to a user's private tag sets. While some existing systems have attempted to disambiguate tags in association with specific bookmarks, the disclosed system enables users to create tag sets independently from specific bookmarks and/or resources.

The tag sets of the disclosed system can advantageously provide folksonomy representations of relationships existing as a result of end users tagging different bookmarks with similar terms (e.g. synonyms, differing stems, etc.). End users are advantageously allowed to create tag sets that contain semantically similar terms, and the resulting tag relationships are used to provide social benefit. The collaborative process of end users grouping different tags having similar or the same meaning provides significant benefits over using a fixed dictionary of synonyms in the same way that a folksonomy offers benefits over a fixed taxonomy. The community driven tag sets of the disclosed system enable a social bookmarking application to account for misspellings of tags, industry specific abbreviations, and an evolving vocabulary of synonyms.

The strength of association of between two tag terms increases as more users group the two terms together. Moreover, unlike a standard folksonomy resulting from social bookmarking activities, the independently created tag set relationships of the disclosed system provide relationships between tags that are expressed independent of the act of tagging a specific resource.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENTS

Figure 1:
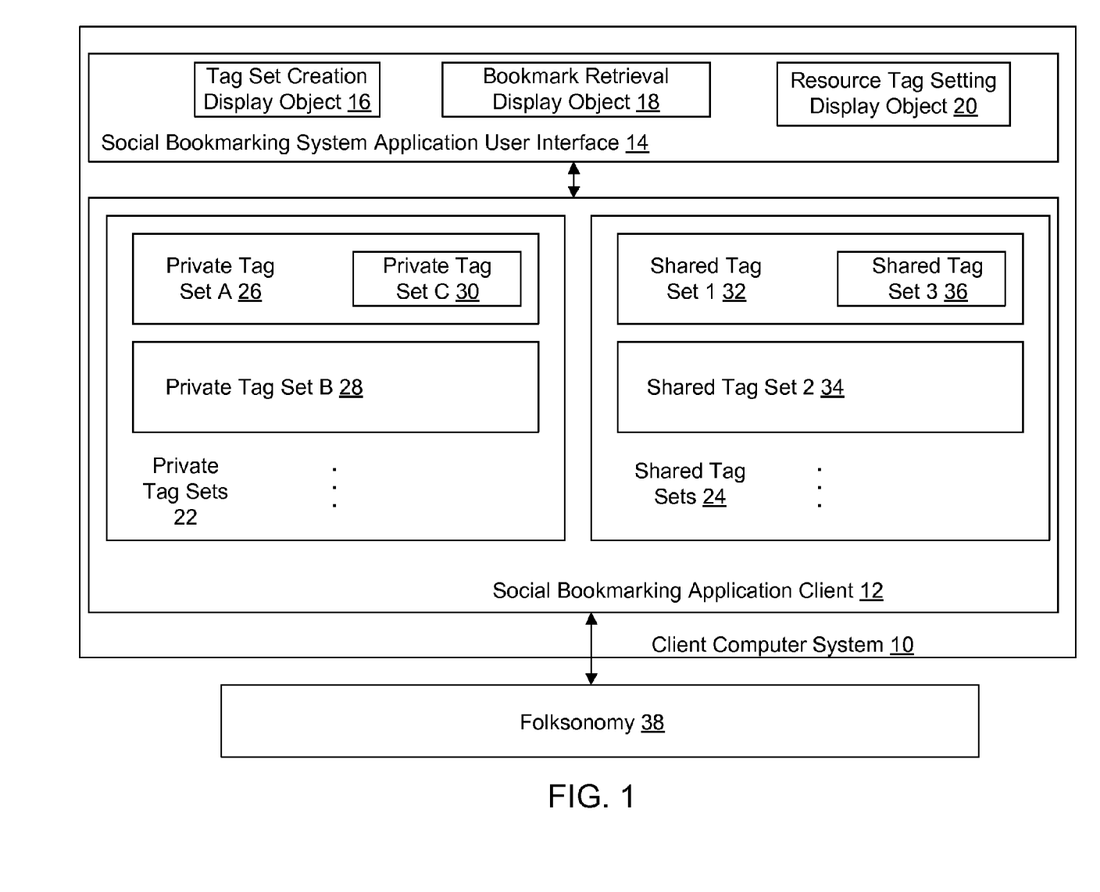
FIG. 1 is a first block diagram showing structure and operation of an illustrative embodiment of the disclosed system.

As shown in FIG. 1, an illustrative embodiment of the disclosed system includes a client computer system 10 on which executes social bookmarking application client software 12. The social bookmarking application client 12 provides a social bookmarking system application user interface 14. Social bookmarking application client software 12 is part of a Web-based social bookmarking service allowing a network of users (also known as a "community" of users) to store bookmarks that may be shared with other users in the network. The bookmarks stored and potentially shared among members of the social bookmarking community are links, such as Uniform Resource Locators (URLs), indicating resources (e.g. Web pages) that users find interesting and/or useful. The social bookmarking service also allows bookmarked resources to be categorized by users through freely assigned, user-defined keywords referred to as "tags", made up of text strings or the like. The social bookmarking service stores the user defined tags in the folksonomy 38, and operates based on the stored tags, for example by allowing searches for bookmarks associated with specific tags. The social bookmarking service may provide various specific services and/or functions based on the bookmarks and tags defined in the folksonomy 38, such as ranking of bookmarked resources by the number of users that have bookmarked them, etc.

As further shown in FIG. 1, the social bookmarking system application user interface 14 includes a tag set creation display object 16, a bookmark retrieval display object 18, and a resource tag setting display object 20. The tag set creation display object 16 enables a local user of the client computer system 10 to create tags sets containing multiple tags. The tag sets created through the tag set creation display object 16 may be private to the local user, or may be shared with other members of the social network provided by the social bookmarking service. The tag sets created through the tag set creation display object 16 enable the local user to group multiple different, but semantically related tags together into tag sets. The tag sets are then used in the disclosed system during bookmark retrieval and bookmark tagging operations.

For example, as shown in FIG. 1, the social bookmarking application client 12 includes or has access to tags sets created through tag set creation display object 16, including private tag sets 22 and shared tag sets 24. The private tag sets 22 are only accessible to a single user, e.g. the user of the client computer system 10, while the shared tag sets 24 are accessible to multiple or all members of the social bookmarking service community. While for purposes of illustration in FIG. 1, the shared tag sets 24 and private tag sets 22 are shown in the application client 12, they may alternatively or additionally be stored to and/or retrieved from the folksonomy 38 (i.e. on a remote server system), as needed on a per operation basis, and/or periodically.

The private tag sets 22 and/or shared tag sets 24 may be nested, such that a hierarchy of tag sets is formed. For example, as shown in FIG. 1, the private tag sets 22 are shown including private tag set A 26, private tag set B 28, etc., where a private tag set C 30 is included ("nested") in private tag set A 26. Similarly, the shared tag sets 24 are shown including shared tag set 132, shared tag set 34, etc., where a shared tag set 336 is included ("nested") in shared tag set 132. While in the example of FIG. 1 a private tag set is shown nested under another private tag set, and a shared tag set is shown nested under another shared tag sets, the disclosed system is not limited to such specific, common-type tag set hierarchies. Accordingly, private tag sets may be nested under shared tag sets, and shared tag sets may be nested under private tag sets in the disclosed system. Moreover, while purposes of concise illustration only a single level of tag set nesting is shown in FIG. 1, multiple levels of tag set nesting may also be provided by the disclosed system.

The bookmark retrieval display object 18 enables a local user to selectively retrieve private and/or shared bookmarks defined by the local user and/or other social bookmarking community members. For example, the bookmark retrieval display object 18 enables a local user to retrieve private and/or shared bookmarks from the folksonomy 38 that are associated by users with a selected tag. Moreover, in the disclosed system, through the bookmark retrieval display object 18, a user may request retrieval of all bookmarks associated with at least one tag in a selected tag set.

The disclosed system further operates to suggest additional tags to be used in a bookmark retrieval operation, based on tag set membership. For example, if the user enters or selects a tag to be used for bookmark retrieval, one embodiment of the disclosed system operates to determine whether that originally entered tag is contained in one or more tag sets. If so, then the disclosed system provides one or more other tags contained in tag sets with the originally entered tag, such that the user is allowed to select additional or alternative tags to be used when retrieving bookmarks for display to the user. If the user selects one or more of the suggested tags in addition to the originally selected tag, then bookmarks associated with any of the original or additionally selected tags are retrieved from the folksonomy 38 and displayed to the user. In another embodiment, the names of any tag sets to which the originally entered tag belongs are displayed to the user for possible selection. If the user selects one or more these suggested tag sets, then all bookmarks indicating resources associated with at least one of the tags belonging to the selected tag sets are retrieved and displayed to the user.

The additional tags and/or tag sets suggested to the user by the disclosed system through the bookmark retrieval display object 18 may be displayed in lists, and may be ordered within such lists in various ways to provide assistance to the user. For example, additional optionally selectable tags belonging to tag sets also containing the originally entered tag may be ordered based on the frequency with which they are contained in tag sets with the original user entered tag. Alternatively, or in addition, only those tags belonging to at least a threshold number of tag sets together with the originally entered tag may be displayed for optional selection by the user through the bookmark retrieval display object 18.

Any specific visual layout may be used to display selectable suggested tags and tag set names in the bookmark retrieval display object 18. Suggested tags and tag set names may accordingly be displayed using user interface constructs such as simple lists, hierarchical or categorized lists, tag clouds, etc. In one embodiment, a first visually separate display area (e.g. list or list segment) is used to display suggested tags or tag sets that are private to the local user, and a second visually separate display area is used to display suggested tags or tag sets that are shared with other community members.

Resource tag setting display object 20 enables the user of client computer system 20 to associate tags with resources for which bookmarks have been or may be defined in the social bookmarking system. The resource tag setting display object 20 enables a local user to define and/or associate a tag or tags with a currently selected bookmark (e.g. with a link to the current Web page being displayed through a Web browser executing on the Client Computer System 10). For example, a button or other user display object may be provided within the user's Web browser user interface or the like enables the user to cause resource tag setting display object 20 to be displayed, so that the user can associate a tag with the bookmark for the currently displayed Web page. The resource tag setting display object 20 provides a field for the user to enter a tag or tags that are to be associated with the bookmark in the folksonomy 38. In the disclosed system, through the resource tag setting display object 20, a user may request that all tags belonging to an indicated tag set be associated with the currently selected bookmark. For example, the user may enter the name of a tag set (either private or shared) into the resource tag setting display object 20 in order to cause all tags in that tag set to be associated with the bookmark for a currently displayed Web page.

The disclosed system further operates to suggest additional tags to be associated with a resource or bookmark based on tag set membership. For example, if the user enters or selects a tag to be associated with the currently displayed Web page, an embodiment of the disclosed system determines whether that tag is contained in one or more tag sets. If so, then the disclosed system provides one or more tags contained in tag sets with the originally entered tag for additional or alternative user selection in the resource tag setting display object 20. If the user selects one or more of the suggested tags in addition to the originally selected tag, then the bookmark for the currently display Web page is associated in the folksonomy 38 with the originally entered tag and each of the additionally selected tags. In another embodiment of the disclosed system, the names of any tag sets to which the originally entered tag belongs are displayed to the user for selection. If the user selects one or more of such suggested tag sets, then all tags in the selected tag sets are associated in the folksonomy 38 with the bookmark for the currently displayed Web page.

The additional tags and/or tag sets suggested to the user by the disclosed system through the resource tag setting display object 20 may be ordered in various ways to assist the user. For example, selectable tags belonging to tag sets that also include the original entered tag for a resource tagging operation may be ordered based on the frequency with which they are contained in tag sets (either private or shared) together with the originally entered tag. Alternatively, or in addition, only tags belonging to at least a threshold number of tag sets together with the originally entered tag may be displayed for optional selection through the resource tag setting display object 18.

Any specific visual layout may be used to display the suggested user selectable tags and tag set names in the resource tag setting display object 20. Tags and tag set names may accordingly be displayed in user interface constructs such as simple lists, hierarchical or categorized lists, tag clouds, etc. In one embodiment, a first visually separate display area (e.g. list or list segment) is used to display suggested tags or tag sets that are private to the local user, and a second such separate display area is used to display suggested tags or tag sets that are shared.

The client computer system 10 of FIG. 1 and folksonomy 38 may, for example, be communicably connected by way of a communication network such as the Internet, a Local Area Network (LAN), or other specific type of communication network. In such an embodiment, the folksonomy 38 may be part of a social bookmarking application service located on a remote server computer system from the client computer system 10. The client software 12 may, for example, use a client-server approach to operating with server application software executing on one or more remote server computer systems to provide portions of the application user interface 14. Alternatively, or in addition, client software 12 may include Web browser program functionality operable to request and receive Web page content, including HTML (Hypertext Markup Language) code or the like, and to render such Web page content in the user interface 14.

The client computer system 10 may include at least one processor, program storage, such as memory, for storing program code executable on the processor, and one or more input/output devices and/or interfaces, such as data communication and/or peripheral devices and/or interfaces. The client computer system 10 may further include appropriate operating system software.

Figure 2:
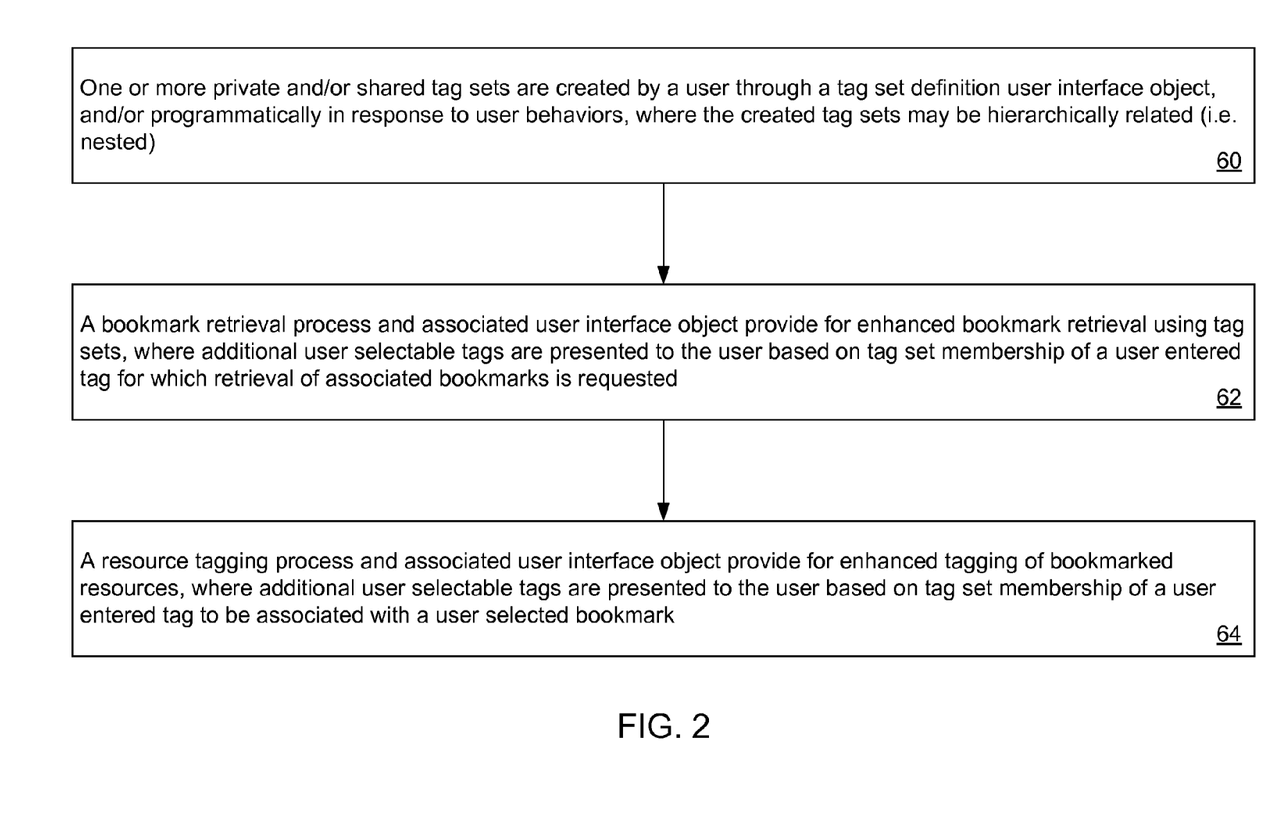
FIG. 2 is a flow chart showing steps performed by an illustrative embodiment of the disclosed system.

FIG. 2 is a flow chart showing steps performed by an illustrative embodiment of the disclosed system. As shown in FIG. 2, at step 60 one or more private and/or shared tag sets are created by a user, for example through a tag definition user interface such as the tag set creation display object 16 of FIG. 1. The private and/or shared tag sets created at step 60 may alternatively, or in addition, be created automatically by execution of program code logic in response to social bookmarking service user behaviors. For example, in an embodiment using automatic tag set generation, tag sets may be dynamically created, for example through machine learning techniques based on frequency of tag co-association with bookmarks. In such an embodiment, when two different tags are determined to both be associated with individual bookmarks more than some threshold number of times, they are automatically grouped together within a tag set.

The tag sets created at step 60 may be hierarchically organized (i.e. nested). The tag sets created at step 60 may be stored locally on a client system computer system, and/or remotely within a folksonomy or the like at a remote server computer system.

At step 62, a bookmark retrieval process and associated user interface object provide for enhanced bookmark retrieval using the tag sets, where additional user selectable tags are presented to the user based on tag set membership of an original user entered tag for which retrieval of associated bookmarks is requested. For example, the bookmark retrieval process of step 62 may be provided through the bookmark retrieval display object 18 shown in FIG. 1.

At step 64, a resource tagging process and associated user interface object provide for enhanced tagging of bookmarked resources, for example through the resource tag setting display object 20 of FIG. 1. In step 64, additional user selectable tags are presented to the user based on tag set membership of an original user entered tag, where the originally entered tag and any additionally user selected tags are then associated by the disclosed system with a user selected bookmarked resource (e.g. a currently displayed Web page).

Figure 3:
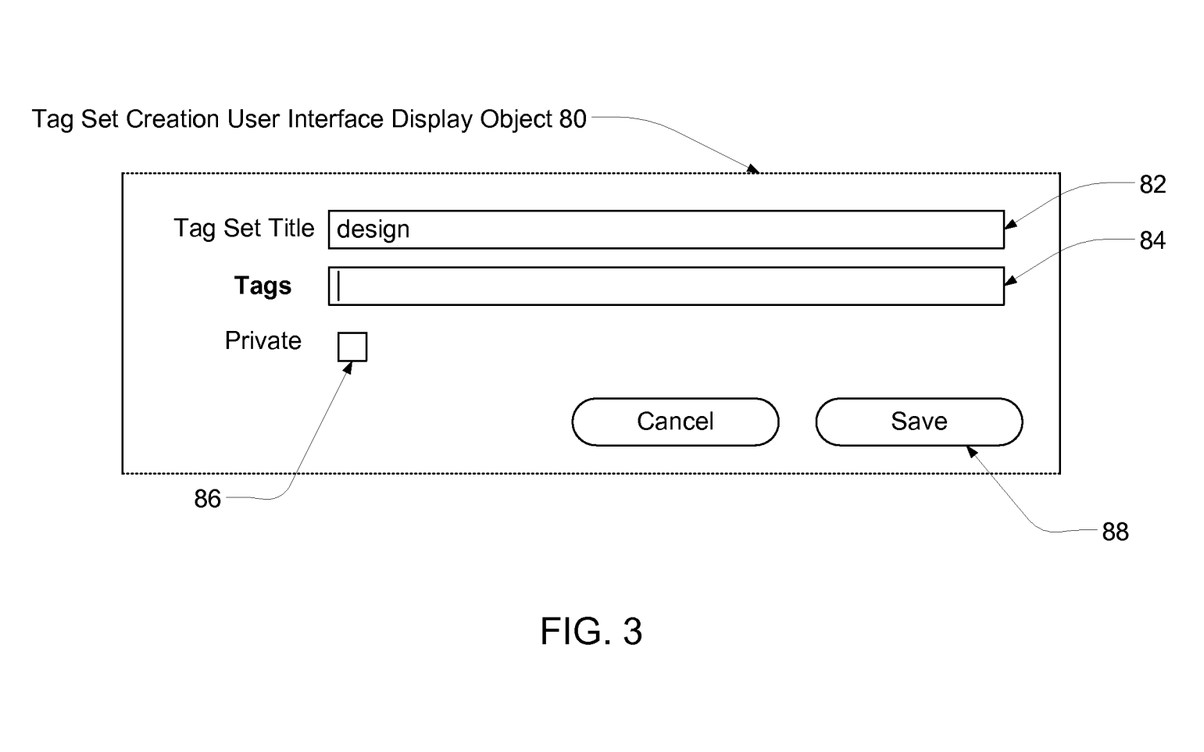
FIG. 3 is a simplified screen shot showing an example of a display object generated by an illustrative embodiment of the disclosed system to enable a user to create a shared or private tag set.

FIG. 3 is a simplified screen shot showing an example of a display object 80 generated by an illustrative embodiment of the disclosed system to enable a user to create a shared or private tag set. The tag set creation user interface display object 80 of FIG. 3 is an example of the tag set creation display object 16 of FIG. 1. As shown in FIG. 3, a tag set title field 82 enables the user to select or enter a name for the tag set being created (e.g. "design"). A tag entry field 84 enables the user to enter a number of tags or names of tag sets to be contained within a tag set being created or modified. A check box 86 enables the user to indicate that the tag set being created is to be private to the creating user. If the check box 86 is not checked, then the tag set being created is shared with other members of the social bookmarking community. When the user is done entering the relevant information for creating or modifying the tag set, clicking on the button 88 causes the tag set to be stored, for example in the folksonomy of the social bookmarking system.

Figure 4:
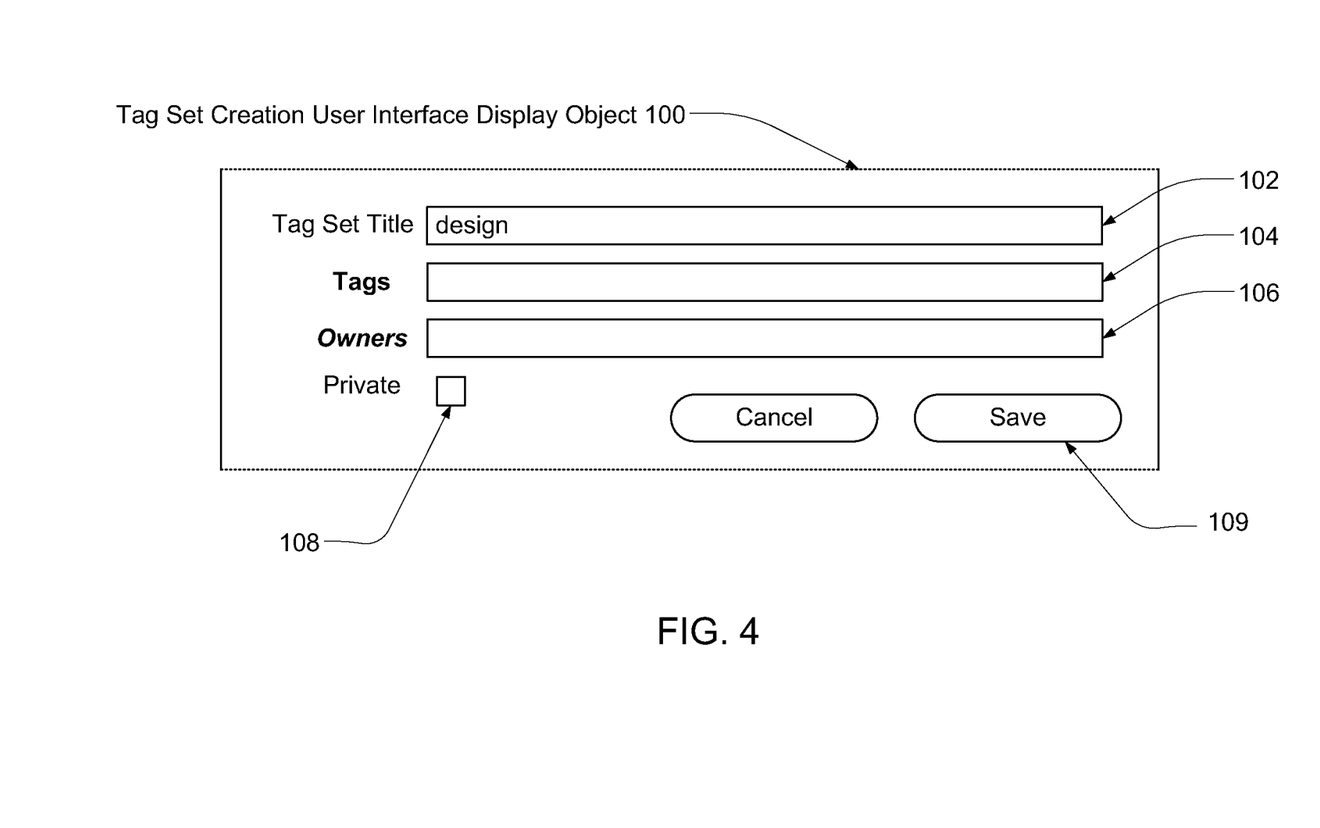
FIG. 4 is a simplified screen shot showing an example of a display object generated by an illustrative embodiment of the disclosed system to enable a user to create a shared or private tag set, and further enabling a user to indicate which users in the social bookmarking community that are owners of the tag set if it is shared.

FIG. 4 is a simplified screen shot showing an example of a display object 100 generated by an illustrative embodiment of the disclosed system to enable a user to create or modify a shared or private tag set, and further enabling a user to indicate which users in the social networking community that are owners of the tag set if it is shared. The tag set creation user interface display object 100 is an example of the tag set creation display object 16 of FIG. 1. The tag set creation user interface display object 100 includes a tag set title field 102 that enables the user to enter or select a name of the tag set being created. A tag entry field 104 enables the user to enter the tags to be contained in the tag set being created. An owners entry field 106 enables the user to enter the user names or group names indicating other community members that are to be considered owners of the tag set being created. In one embodiment of the disclosed system, only those users defined as owners of a tag set are allowed to modify the set of tags contained in that tag set. In another embodiment of the disclosed system, only owners of a tag set are allowed to have access to the tag set. A check box 108 enables the creating user to indicate whether the tag set being created is to be private or shared with other members of the social bookmarking community. When all information for the tag set has been entered, clicking on the button 109 causes the tag set to be stored, for example in the folksonomy of the social bookmarking system.

Figure 5:
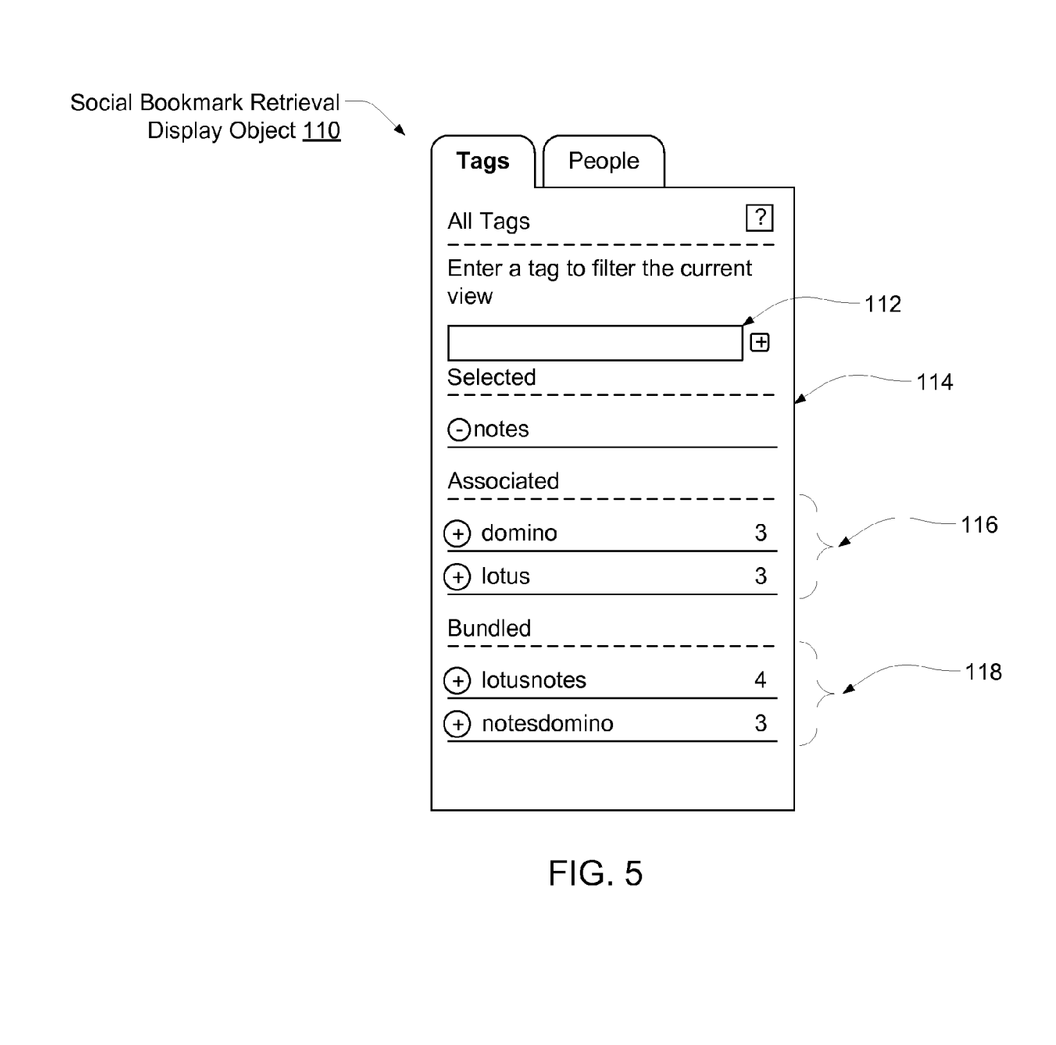
FIG. 5 is a simplified screen shot showing an example of a display object generated by an illustrative embodiment of the disclosed system to enable a user to modify a display of bookmark information retrieved from a social bookmarking system.

FIG. 5 is a simplified screen shot showing an example of a display object 110 generated by an illustrative embodiment of the disclosed system to enable a user to modify a display of bookmarks retrieved from a folksonomy of a social bookmarking system. The bookmark retrieval display object 110 is an example of at least a portion of the bookmark retrieval display object 18 of FIG. 1. The bookmark retrieval display object 110 includes a tag entry field 112 that enables the user to enter a tag causing a set of currently displayed bookmarks to be limited to only those bookmarks for resources that have been associated with the entered tag. In the example of FIG. 5, the user has previously entered or selected the tag "notes" 114. Accordingly, the bookmarks currently displayed to the user (e.g. outside the bookmark retrieval display object 110 but within the user interface 14 of FIG. 1) are those bookmarks associated with the tag "notes" 114. In one embodiment of the disclosed system, any tags grouped by the local user together with the currently selected tag "notes" 114, e.g. within one or more private tag sets, are also automatically included when determining which bookmarks are displayed to the user. Accordingly, if the currently selected tag "notes" 114 were contained within a private tag set defined by the local user, then all bookmarks associated with at least one tag within that tag set would be displayed in response to a user's previous selection of the currently selected "notes" tag 114. The user can then click on one of such retrieved and displayed bookmarks in the user interface to navigate to a corresponding resource (e.g. Web page) for that bookmark.

A number of associated tags 116 are also displayed to the user. The associated tags 116 are tags that are associated with bookmarks that are also associated with the currently selected tag (e.g. "notes"). The user can click on one or more of the associated tags 116 to cause the currently displayed set of bookmarks to be further filtered to only include bookmarks of resources that are associated with both the tag "notes" and the one of the associated tags 116 that was clicked on. Tags that are more frequently associated with the currently selected tag are displayed relatively closer to the top of the associated tags 116. The numbers at the right of each tag in the associated tags 116 indicate the number of times the tag was associated with the currently selected tag.

A number of bundled tags 118 are also presented in the display object 110, indicating tags that are not associated with the currently selected tag ("notes") by way of being associated with bookmarks also associated with the currently selected tag, but that are grouped with the currently selected tag within one or more tag sets, e.g. co-contained within at least a threshold number of public tag sets defined by other users. Tags that are more frequently grouped with the currently selected tag in such public tag sets defined by other users are located relatively closer to the top of the bundled tags 118. The user can click on one or more of the bundled tags 118 to cause the currently displayed set of bookmarks to include bookmarks associated either with the currently selected tag as well as additionally including bookmarks associated with any other tags within the bundled tags 118 clicked on by the user. The numbers at the right of each tag in the bundled tags 118 indicate the number of tags sets in which the tag was bundled with the currently selected tag.

In an alternative embodiment, the information provided regarding associated tags 116 and/or bundled tags 118 may be obtained by a user through a tooltip graphical user interface element or the like provided when the user hovers the cursor over a tag.

Figure 6:
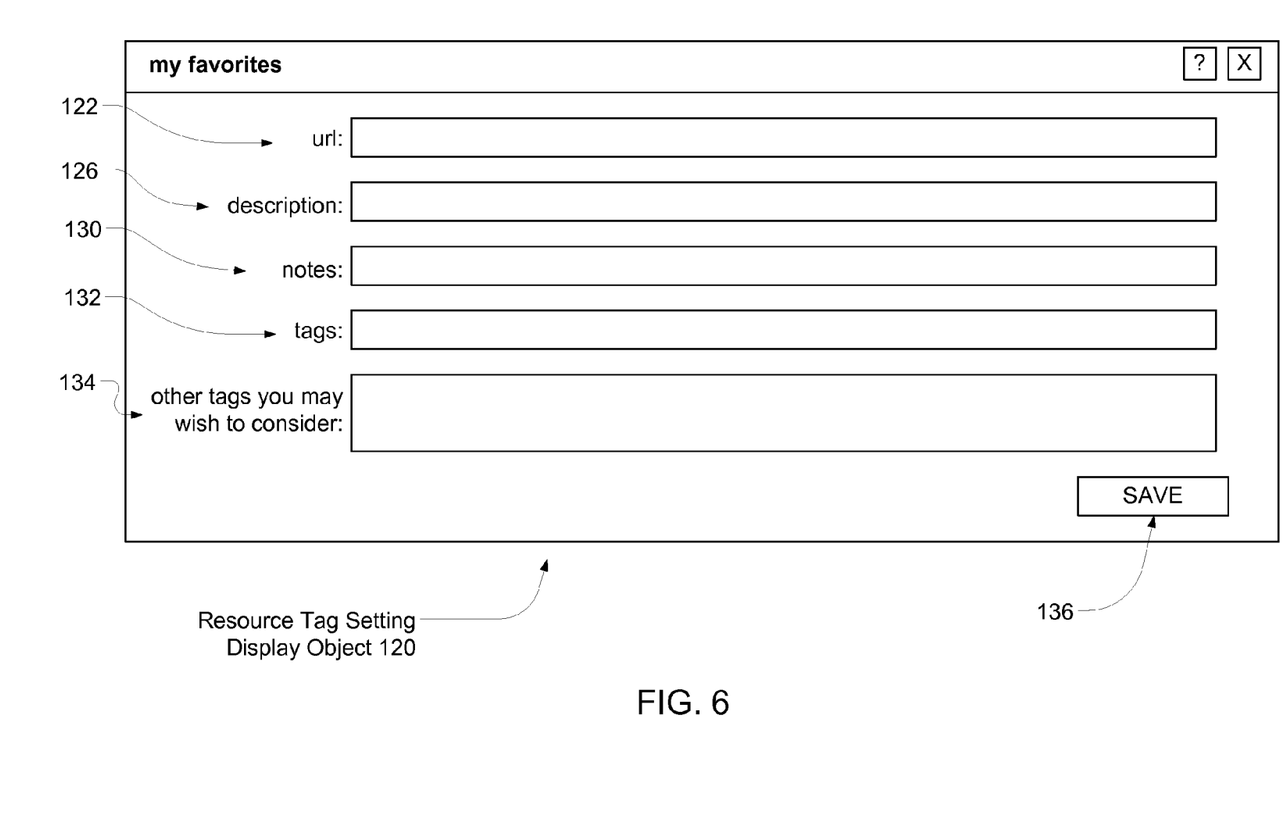
FIG. 6 is a simplified screen shot showing an example of a display object generated by an illustrative embodiment of the disclosed system to enable a user to associate one or more tags with a bookmark.

FIG. 6 is a simplified screen shot showing an example of a display object 120 generated by an illustrative embodiment of the disclosed system to enable a user to associate one or more tags with a bookmark. The resource tag setting display object 120 is an example of the resource tag setting display object 20 of FIG. 1. As shown in FIG. 6, the resource tag setting display object includes a URL field 122 that displays the Uniform Resource Locator (URL) of the currently selected resource, e.g. the current Web page displayed in a Web browser application on the client computer system. A description field 126 displays a shared description to be associated with the bookmark for the currently selected resource. A notes field 130 displays and/or enables the user to enter user specific notes to be associated with the bookmark for the currently selected resource. A tags field 132 enables the user to enter one or more tags to be associated with the bookmark for the currently selected resource. When the user enters a tag into the tags field 132, the disclosed system operates to determine the tag set memberships for the entered tag. Based on those tag set memberships, the disclosed system further operates to determine a number of other tags belonging to tag sets that the user entered tag also belongs to. A number of those tags also belonging to at least one tag set to which the tag entered into field 132 also belongs are displayed in the suggested tags field 134. The user can then replace the previously entered tag in field 132 with one or more of the suggested tags displayed in field 134, or additionally include in field 132 one or more of the suggested tags displayed in field 134. A minimum threshold of common tag set memberships may be required for a tag to be suggested in the field 134. For example, tags may only be suggested in field 134 if they are included in at least a threshold number of tag sets along with a tag entered into field 132. When the user clicks on the save button 136, the information in the fields of the display object 120 is stored in the folksonomy of the social bookmarking system.

In one embodiment, the disclosed system also enables a user to associate all tags contained in a tag set with the bookmark for the currently selected resource by entering the tag set name into the field 132 prior to clicking on the save button 136.

The disclosed system may advantageously be applied in various specific contexts, to support social bookmarking communities of various specific types. For example, the disclosed system may be used to provide collaborative tag sets that assist in organizing the on-line resources of what may be referred to as a community of practice. Specifically, the disclosed system may advantageously be embodied to support one or more communities of practice related to "minority disciplines". Such communities of practice may consist of diffuse users with similar backgrounds and skills, but who happen work within different departments of a larger business organization. Some examples of communities of practice related to minority disciplines include groups of software designers, groups of accountants, and groups of project managers that are each individually assigned to work within different product development teams in a technology business. These user groups are each a "minority discipline" within the larger organization, and users within each group need contact with other group members in order to keep their skills current.

Using the disclosed system, a community of practice can create their own on-line resources that can be accessed asynchronously by community members. This is advantageous because each minority discipline has its own perspective on professional practice, and may be ill-served by on-line resources created to meet the needs of the majority discipline within which the minority discipline contributes. A social-bookmarking system in accordance with the disclosed system provides an opportunity for a minority discipline to store its resources in the same general space as the majority discipline, but to also access their own resources in their own ways, using their own tags and tag sets. The disclosed system enables the resources of a minority discipline to be organized into tag sets associated with those resources. The disclosed system provides the ability to create structured sets of tags that can meet the unique needs of each minority discipline or community of practice. The disclosed tag sets may be created such that they are only editable (owned) by members of a specific community of practice (see FIG. 4).

As noted above, a tag set may advantageously be used to encompass different semantically related tags. Tag sets may be defined as lists of spelling variations or lists of synonyms. A tag set in the disclosed system may further be used to define a superset of tags within a given category. For example, where the "#" symbol indicates a tag set name, an "#Accessibility" tag set could include tags such as "blind," "color-blind," "high-contrast," "magnifier," "deaf," "disability," "screen-reader," "jitter-control," etc. Similarly, a "#Programming-language" tag set could include tags such as "ruby," "python," "java," and so on.

As also noted above, tag sets may advantageously be nested. For example, it might be desirable to define a tag set for each major class of disability. The resulting hierarchy of tag sets could accordingly be:

```
#Accessibility
    #Vision-disability
        blind
        color-blind
        screenreader
        high-contrast
    #Deaf
        deafnet-relay-service
    #Motoric-disability
        jitter-control
```

With such a tag set hierarchy, a user of the disclosed system can advantageously select the breadth of concept that is appropriate for a given task. In some cases, the user would search for bookmarks using a specific tag, such as "screenreader." In other cases, the user might be concerned with issues of vision, and might use the tag set name "#Vision-disability" to obtain bookmarks tagged with any tag contained in that tag set. Similarly, to obtain information broadly related to accessibility compliance, the user might use the broadest category, "#Accessibility", to retrieve the most comprehensive set of associated bookmarks.

While the preceding description uses the term "tag sets" to describe the collaborative tag groupings provided by the disclosed system, any appropriate term may be used in the alternative. Possible alternative terms in this regard include bundles, aliases, etc.

The disclosed system can take the form of an entirely software embodiment, an entirely hardware embodiment, or an embodiment containing both software and hardware elements. The figures include block diagram and flowchart illustrations of methods, apparatus(s) and computer program products according to an embodiment of the invention. It will be understood that each block in such figures, and combinations of these blocks, can be implemented by computer program instructions. These computer program instructions may be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using wireless, baseband signaling or broadband signaling techniques, including carrier wave signaling techniques, such as over computer or telephone networks via a modem.

While the invention is described through the above exemplary embodiments, it will be understood by those of ordinary skill in the art that modification to and variation of the illustrated embodiments may be made without departing from the inventive concepts herein disclosed.

We claim:

1. A method of providing collaborative tag sets to assist navigation of a folksonomy, comprising:
    creating a tag set definition user interface display object, wherein said tag set definition user interface display object enables a user to define a tag set by indicating a plurality of tags to be contained in said tag set, wherein each of said tags contained in said tag set are available for association with bookmarks in a folksonomy;
    wherein said tag set definition user interface display object is created independently from any bookmark;
    conveying the contents of said tag set to said folksonomy;
    creating a bookmark retrieval user interface display object, wherein said bookmark retrieval user interface display object enables a user to retrieve a list of bookmarks associated with an originally entered tag;
    determining that said originally entered tag is contained within said tag set;
    responsive to said determination that said originally entered tag is contained within said tag set, displaying at least one list of selectable tags including at least one other tag contained in said tag set;
    enabling said user to select at least one additional tag from said list of selectable tags; and
    displaying bookmarks associated with said originally entered tag and bookmarks associated with said at least one additional tag.

2. The method of claim 1, further comprising:
    wherein said tag set definition user interface display object further enables said user to indicate whether said tag set is private or public;
    wherein in the event that said local user indicates that said tag set is public, said tag set is shared with other users; and
    wherein in the event that said local user indicates that said tag set is private, said tag set is not shared with other users.

3. The method of claim 2, further comprising:
    wherein said tag set is a first tag set, and wherein said tag set definition user interface display object further enables said user to include a second tag set within said first tag set, such that by including said second tag set within said first tag set said second tag set is hierarchically nested under said first tag set, such that subsequent selection by said user of said first tag set automatically selects all tags contained in said second tag set.

4. The method of claim 3, further comprising:
    creating a bookmark retrieval user interface display object, wherein said bookmark retrieval user interface display object enables a user to retrieve a list of bookmarks associated with an originally entered tag;
    determining that said originally entered tag is a tag set name associated with said tag set; and
    retrieving and displaying all bookmarks associated with at least one tag contained in said tag set.

5. The method of claim 4, further comprising displaying a list of selectable tag set names from which said local user can select said tag set name.

6. The method of claim 1, wherein said at least one list of selectable tags includes a first list of tags contained only in private tag sets.

7. The method of claim 6, wherein said at least one list of selectable tags includes a second list of tags only contained in shared tag sets.

8. The method of claim 7, wherein said tags contained in said list of selectable tags are ordered based on the number of times each selectable tag is contained in tag sets with said originally entered tag.

9. The method of claim 8, wherein only tags contained with said originally entered tag in at least a threshold number of tag sets are included in said list of selectable tags.

10. The method of claim 1, further comprising:
    creating a tag association user interface display object, wherein said tag association user interface display object enables said user to associate a tag with a bookmark;
    receiving an originally entered tag entered by said user into said tag association user interface display object;
    determining that said originally entered tag is contained in said tag set;
    responsive to said determining that said originally entered tag is contained in said tag set, displaying at least one list of selectable tags including at least one tag contained in said tag set other than said originally entered tag; and
    enabling said user to select tags from said list for association with said bookmark.

11. The method of claim 10, wherein said displaying said list of selectable tags comprises:
    displaying a first list of selectable tags including only tags contained in private tag sets.

12. The method of claim 11, wherein said displaying said list of selectable tags comprises:
    displaying a second list of selectable tags including only bookmarks contained in shared tag sets.

13. The method of claim 10, wherein said tags contained in said list of selectable tags are ordered based on the number of times each selectable tag is contained with said originally entered tag in a tag set.

14. The method of claim 10, wherein only tags contained with said originally entered tag in at least a threshold number of tag sets are included in said list of selectable tags.

15. A computer system including a computer readable storage medium, said computer readable storage medium having computer program code stored thereon for providing collaborative tag sets to assist navigation of a folksonomy, wherein said program code, when executed, causes said computer system to:

- create a tag set definition user interface display object, wherein said tag set definition user interface display object enables a local user to define a tag set by indicating a plurality of tags to be contained in said tag set, wherein each of said tags contained in said tag set are available for association with bookmarks in a folksonomy;
- wherein said tag set definition user interface display object is created independently from any bookmark;
- convey the contents of said tag set to said folksonomy;
- create a bookmark retrieval user interface display object, wherein said bookmark retrieval user interface display object enables a user to retrieve a list of bookmarks associated with an originally entered tag;
- determine that said originally entered tag is contained within said tag set;
- responsive to said determination that said originally entered tag is contained within said tag set, display at least one list of selectable tags including at least one other tag contained in said tag set;
- enable said user to select at least one additional tag from said list of selectable tags; and
- display bookmarks associated with said originally entered tag and bookmarks associated with said at least one additional tag.

16. A computer program product including a computer readable storage medium, said computer readable storage medium having computer program code stored thereon for providing collaborative tag sets to assist navigation of a folksonomy, wherein said program code, when executed, causes a computer system to:

- create a tag set definition user interface display object, wherein said tag set definition user interface display object enables a local user to define a tag set by indicating a plurality of tags to be contained in said tag set, wherein each of said tags contained in said tag set are available for association with bookmarks in a folksonomy;
- wherein said tag set definition user interface display object is created independently from any bookmark;
- convey the contents of said tag set to said folksonomy;
- create a bookmark retrieval user interface display object, wherein said bookmark retrieval user interface display object enables a user to retrieve a list of bookmarks associated with an originally entered tag;
- determine that said originally entered tag is contained within said tag set;
- responsive to said determination that said originally entered tag is contained within said tag set, display at least one list of selectable tags including at least one other tag contained in said tag set;
- enable said user to select at least one additional tag from said list of selectable tags; and
- display bookmarks associated with said originally entered tag and bookmarks associated with said at least one additional tag.

* * * * *